United States Patent
Heit et al.

(10) Patent No.: US 10,846,195 B2
(45) Date of Patent: Nov. 24, 2020

(54) CONFIGURING LOGGING IN NON-EMULATED ENVIRONMENT USING COMMANDS AND CONFIGURATION IN EMULATED ENVIRONMENT

(71) Applicants: James R Heit, Roseville, MN (US); Robert L Bergerson, Roseville, MN (US); Jason C Schultz, Roseville, MN (US); John A Peters, Roseville, MN (US)

(72) Inventors: James R Heit, Roseville, MN (US); Robert L Bergerson, Roseville, MN (US); Jason C Schultz, Roseville, MN (US); John A Peters, Roseville, MN (US)

(73) Assignee: Unisys Corporation, Blue Bell, PA (US)

(*) Notice: Subject to any disclaimer, the term of this patent is extended or adjusted under 35 U.S.C. 154(b) by 523 days.

(21) Appl. No.: 14/874,642

(22) Filed: Oct. 5, 2015

(65) Prior Publication Data

US 2017/0097878 A1 Apr. 6, 2017

(51) Int. Cl.
*G06F 11/34* (2006.01)

(52) U.S. Cl.
CPC ................... *G06F 11/3476* (2013.01)

(58) Field of Classification Search
CPC .................................................. G06F 11/3476
USPC .......................................................... 703/23
See application file for complete search history.

(56) References Cited

U.S. PATENT DOCUMENTS

| | | | |
|---|---|---|---|
| 8,826,273 B1* | 9/2014 | Chen | G06F 9/45558 718/1 |
| 9,069,701 B2* | 6/2015 | Guthrie | G06F 12/0806 |
| 10,044,675 B1* | 8/2018 | Ettema | G06F 9/45558 |
| 2006/0184937 A1* | 8/2006 | Abels | G06F 9/455 718/1 |
| 2006/0253549 A1* | 11/2006 | Arakawa | G06F 21/80 709/217 |
| 2007/0244938 A1* | 10/2007 | Michael | G06F 16/128 |
| 2009/0070761 A1* | 3/2009 | Zhao | G06F 9/45558 718/1 |
| 2009/0119493 A1* | 5/2009 | Venkitachalam | G06F 11/3636 712/238 |
| 2009/0216816 A1* | 8/2009 | Basler | G06F 11/1464 |
| 2009/0222496 A1* | 9/2009 | Liu | G06F 11/1453 |
| 2009/0248611 A1* | 10/2009 | Xu | G06F 9/45533 |
| 2010/0049930 A1* | 2/2010 | Pershin | G06F 11/1451 711/162 |
| 2010/0107158 A1* | 4/2010 | Chen | G06F 11/1484 718/1 |
| 2011/0289417 A1* | 11/2011 | Schaefer | G06F 11/2028 715/735 |
| 2012/0072908 A1* | 3/2012 | Schroth | G06F 9/5033 718/1 |

(Continued)

*Primary Examiner* — Iftekhar A Khan (57) ABSTRACT

Methods and systems for logging data in a computing system are disclosed. The methods and systems include receiving a first request to create log data of an activity of the computing system. The methods and systems further include acquiring information about the activity of the computing system. The methods and systems further include creating the log data of the activity of the computing system. The methods and systems further include retrieving stored log data.

17 Claims, 8 Drawing Sheets

(56) References Cited

U.S. PATENT DOCUMENTS

| | | | |
|---|---|---|---|
| 2012/0072923 A1* | 3/2012 | Robles | G06F 9/45545 719/319 |
| 2012/0102368 A1* | 4/2012 | Heit | G06F 11/0727 714/48 |
| 2013/0054680 A1* | 2/2013 | Nakano | G06F 11/3476 709/203 |
| 2013/0166272 A1* | 6/2013 | Schultz | G06F 11/349 703/23 |
| 2013/0227352 A1* | 8/2013 | Kumarasamy | G06F 11/1461 714/47.1 |
| 2013/0283265 A1* | 10/2013 | Acharya | G06F 9/45558 718/1 |
| 2013/0290782 A1* | 10/2013 | Chen | G06F 11/14 714/19 |
| 2013/0329606 A1* | 12/2013 | Jones | H04L 12/6418 370/259 |
| 2013/0332595 A1* | 12/2013 | Jones | H04L 12/1435 709/224 |
| 2013/0332596 A1* | 12/2013 | Jones | H04L 43/0882 709/224 |
| 2013/0332922 A1* | 12/2013 | Entezari | G06F 9/45558 718/1 |
| 2014/0007119 A1* | 1/2014 | Liu | G06F 11/0745 718/102 |
| 2014/0019750 A1* | 1/2014 | Dodgson | H04L 63/0281 713/153 |
| 2014/0064293 A1* | 3/2014 | Deisinger | H04L 47/32 370/412 |
| 2014/0064295 A1* | 3/2014 | Deisinger | H04L 47/20 370/412 |
| 2014/0067886 A1* | 3/2014 | Sakanashi | G06F 11/0778 707/825 |
| 2014/0123221 A1* | 5/2014 | Farina | H04L 67/10 726/3 |
| 2014/0123230 A1* | 5/2014 | Farina | G06F 21/53 726/4 |
| 2014/0149576 A1* | 5/2014 | Pavlov | G06F 11/0781 709/224 |
| 2014/0279918 A1* | 9/2014 | Han | G06F 11/366 707/648 |
| 2015/0186180 A1* | 7/2015 | Schroth | G06F 9/5033 718/102 |
| 2015/0295800 A1* | 10/2015 | Bala | H04L 67/2809 709/224 |
| 2016/0028819 A1* | 1/2016 | Schultz | H04L 67/1097 709/212 |
| 2016/0098365 A1* | 4/2016 | Bshara | G06F 13/105 710/104 |
| 2016/0179797 A1* | 6/2016 | Merten | G06F 12/0802 711/203 |
| 2016/0364335 A1* | 12/2016 | Deisinger | H04L 45/742 |
| 2016/0380984 A1* | 12/2016 | Johnson | H04L 63/0272 713/153 |
| 2017/0149584 A1* | 5/2017 | Schultz | H04L 41/0823 |
| 2017/0237735 A1* | 8/2017 | Johnson | H04L 63/083 726/5 |
| 2018/0027006 A1* | 1/2018 | Zimmermann | H04L 63/0245 726/11 |
| 2018/0150346 A1* | 5/2018 | Jade | G06F 11/3476 |

\* cited by examiner

(PRIOR ART)

FIG. 6

(PRIOR ART)

CONFIGURING LOGGING IN NON-EMULATED ENVIRONMENT USING COMMANDS AND CONFIGURATION IN EMULATED ENVIRONMENT

FIELD OF THE DISCLOSURE

The instant disclosure relates generally to computer loggings. More specifically, this disclosure relates to embodiments enabling a non-emulated environment, e.g., operating system or the like, to share log data with an emulated environment, e.g., emulated operating system, emulated computer program, emulated virtual machine, or the like.

BACKGROUND

An emulated environment is separate from a non-emulated environment. Therefore, log data of the emulated environment and log data of the non-emulated environment are also separate. This separation of log data makes debugging of applications, e.g., networking applications, difficult.

SUMMARY

The log data of a non-emulated environment, e.g., a System Architecture Interface Layer (SAIL) based operating system, may be shared with an emulated environment, e.g., OS 2200 and/or CPCommOS, by using commands and configurations of the emulated environment. According to one embodiment, a method for logging data in a computing system may include receiving, at a processor executing an operating system, a first request from an emulated environment to create log data of an activity of the computing system. The method may further include acquiring, at the processor executing the operating system, information about the activity of the computing system. The method may further include creating, with the processor executing the operating system, the log data of the activity of the computing system.

According to anther embodiment, computer program product may include a non-transitory computer-readable medium comprising instructions which, when executed by a processor of a computing system, cause the processor to perform the steps of receiving a first request from an emulated environment to create log data of an activity of the computing system. The medium may also include instructions which cause the processor to perform the step of acquiring information about the activity of the computing system. The medium may also include instructions which cause the processor to perform the step of creating the log data of the activity of the computing system.

According to yet another embodiment, an apparatus may include a memory and a processor coupled to the memory. The processor may be configured to execute the steps of receiving a first request from an emulated environment to create log data of an activity of the computing system. The processor may also be configured to execute the step of acquiring information about the activity of the computing system. The processor may further be configured to execute the step of creating the log data of the activity of the computing system.

It is expressly noted that the term "emulated environment" used herein in the disclosure includes any software, hardware environment, virtual machine, or the like, that is emulated, including, but not limited to, an emulated operating system, e.g., Linux, Windows, Java, Unix, OS 2200, or the like, and any computer program running within the emulated operating system, e.g., CPCommOS. For example, the request of "a request from an emulated environment" may be made by a processor executing an emulated operating system, e.g. OS 2200, and/or any computer program running within an emulated operating system, e.g., CPCommOS.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
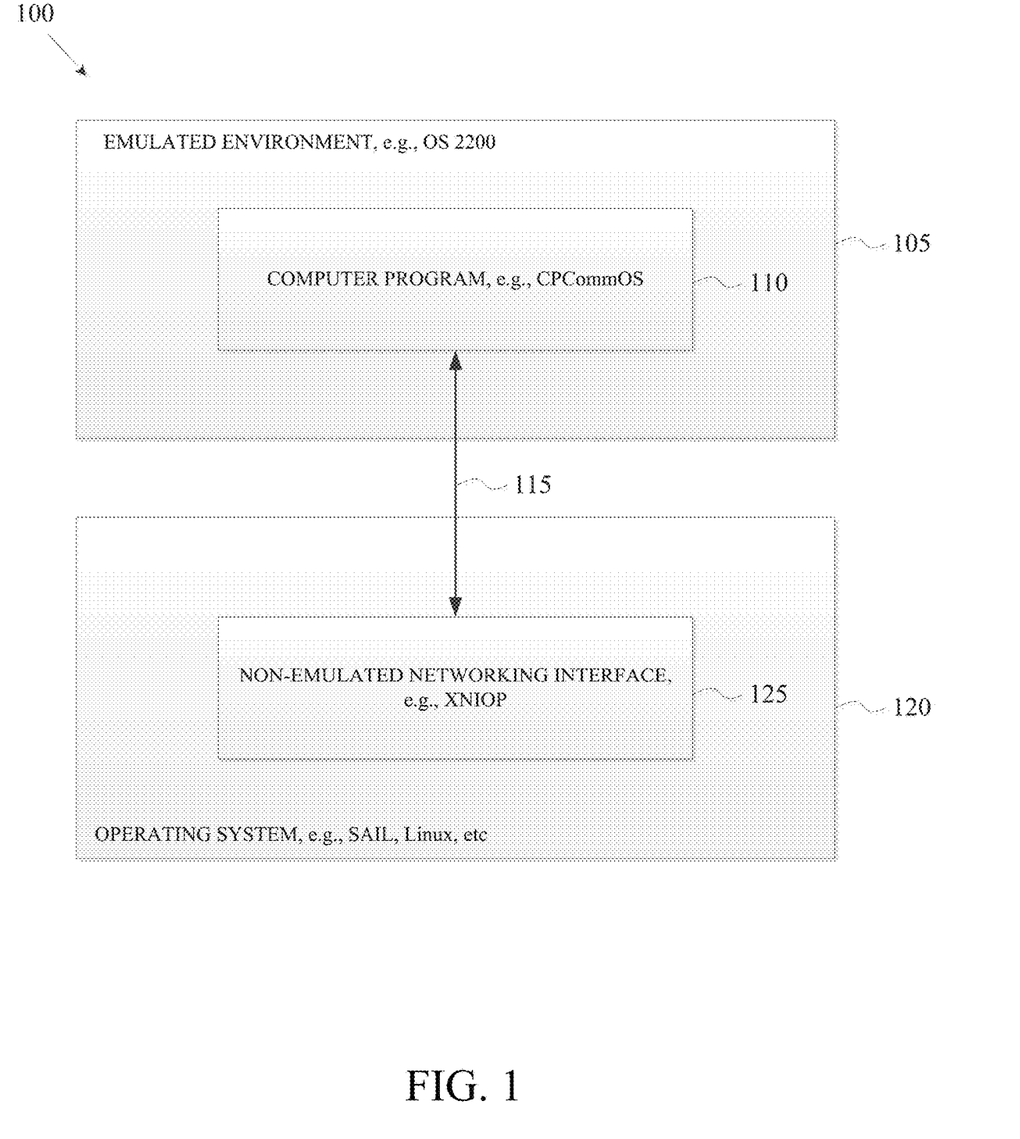
FIG. 1 is a schematic block diagram illustrating a computing system including an operating system and an emulated environment according to one embodiment of the disclosure.

FIG. 1 is a schematic block diagram illustrating a computing system 100 including an operating system 120 and an emulated environment 105 according to one embodiment of the disclosure. In the computing system 100, the operating system 120 is a non-emulated environment. The emulated environment 105 may include instruction sets that are emulated or translated, via software, executing on an underlying instruction set of the operating system 120, such as from a commodity instruction processor, such as the x86 processor, and Linux. Examples of computing devices useable to execute computing instructions constituting the computing system 100 are discussed below in connection with FIGS. 6-8. The computing system 100 shown in FIG. 1 may be used to perform the embodiments of systems and methods disclosed herein, such as the methods shown in FIGS. 2-5.

In the embodiment shown in FIG. 1, the computing system 100 includes an operating system 120 and an emulated environment 105. In one embodiment, the computing system 100 may be a server that includes networking components and other hardware components. The emulated environment 105 may be an emulated operating system, e.g., Linux, Windows, Java, Unix, OS 2200, or the like. In one embodiment, the emulated environment 105 may execute instruction sets on a server, controlled by an operating system 120, e.g. System Architecture Interface Layer (SAIL), Unix, Linux, or the like. The operating system 120 may include drivers for accessing networking components and other hardware components of the computing system 100.

As shown in FIG. 1, the emulated environment 105 includes a computer program 110. In one embodiment, the computer program 110 can be a communication platform, such as CPCommOS, that is able to connect application programs on one or more network connected servers that have terminals, workstations, and other applications in a data communication network. As shown in FIG. 1, a communication 115 is established between the computer program 110 and a non-emulated networking interface 125. The computer program 110 may access a networking function of the operating system 120 through the non-emulated networking interface 125, such as Extended Network Input Output Processor (XNIOP). The non-emulated networking interface 125 may translate requests from the computer program 110 for accessing the networking functions of the operating system 120.

In some embodiments, the operating system 120, e.g., SAIL, Unix Linux, or the like, may be responsible for loading and initializing the emulated environment 105 and/or the computer program 110. According to another embodiment, operating system 120 may also be responsible for initializing the non-emulated interface 125 to establish networking functions during a regular operation or a computer system startup.

In some embodiments, the operating system 120 may include instruction sets and drivers for the non-emulated networking interface 125 (e.g., XNIOP) that includes various networking components, e.g., transmission control protocol/internet protocol (TCP/IP), transport layer security (TLS), secure sockets layer (SSL), user datagram protocol (UDP), routing information, etc. Logging capability may exist in each and every component of the non-emulated networking interface 125.

In other embodiments, the computer program 110. e.g., CPCommOS, in the emulated environment 105 may initiate a request to the non-emulated networking interface 125, e.g., XNIOP, at the processor executing the operating system 120 to create log data. In one embodiment, the request may be made by a user through a console command. The log data may log various information, e.g., number of fields, type of logged activity, sub-type of logged activity, data input size, upload request, upload byte count, log showing request, number of log showing fields, etc. In one embodiment, the log data may be defined using the following instructions:

```
Struct cadbug_cmd_struct
{
    Struct translator_header trans_hdr;
    WORD2200    number_of_fields;
    WORD2200    type;
    WORD2200    sub_type;
    WORD2200    max_input_size;
    WORD2200    upload_command;
    WORD2200    upload_byte_count;
    WORD2200    log_show_command;
    WORD2200    nbr_log_show_fields;
    #ifndef XNIOP
    char    param1 [MAX_CADBUG_FIELD_SIZE];
    char    param2[MAX_CADBUG_FIELD_SIZE];
    char    command_result[MAX_CADBUG_RESULT_SIZE];
    #else
    WORD2200    param1[MAX_CADBUG_FIELD_SIZE / 4];
    WORD2200    param2[MAX_CADBUG_FIELD_SIZE / 4];
    WORD2200    command_result
[MAX_CADBUG_RESULT_SIZE /4];
    #endif
    WORD2200    console_routing_id;
}
```

The log data may log any type of activity performed by the non-emulated networking interface (XNIOP) 125. In one embodiment, the log data may log networking activities. The networking activities to be logged may include activities done through, without limitation e.g., transmission control protocol/internet protocol (TCP/IP), transport layer security (TLS), secure sockets layer (SSL), user datagram protocol (UDP), routing, or the like. In other embodiments, the log data may log non-networking activities.

In some other embodiments, the computer program 110, e.g., CPCommOS, in the emulated environment 105 may initiate a request to the non-emulated networking interface 125, e.g., XNIOP, at the processor executing the operating system 120 to set a log level for log data. The log level may be defined in different degrees, without limitation for example, LOW, MEDIUM, HIGH, etc. In some embodiments, log levels may be set for log data that are already stored in computer-readable mediums. In some other embodiments, log levels may be set for log data that will be created for future activities.

In one embodiment, the request for setting a log level can be made by the computer program 110 simultaneously at the same time when making a request for creating log data. In another embodiment, the request for setting a log level can be made by the computer program 110 before or after making a request for creating log data.

In one embodiment, the computer program 110 may set the log level of all log data without specifying any component and/or activity. In one embodiment, the computer program 110 may set log level without specifying any component and/or activity by using the following instruction:

CPCOMM CADBUG COMMAND LOG <LOGLEVEL>

In another embodiment, the computer program 110 may set log level for a specific activity and/or component. In one embodiment, the computer program 110 may set log levels for a specific activity and/or component using the following instruction:

CPCOMM CADBUG COMMAND LOG <COMPONENT><LOGLEVEL>

Log levels may be set for any XNIOP component and/or activity, e.g., TPC/IP, TLS, SSL, UDP, routing, or the like.

Requests for creating log data and setting log levels may be made through console commands entered by the user. In some other embodiments, the requests for creating log data and setting log levels may be made without a console command entered by the user. In one embodiment, the requests may be made automatically by the configuration file of the computer program 110, e.g., configuration file of CPCommOS. A configuration file of the computer program 110 may be immediately processed during an initiation process of the computer program 110. In such a manner, the requests for creating log data and setting up log levels may be made automatically during an initiation process without a console command entered by the user. Making the requests for creating log data and setting log levels through a configuration file of the computer program 110 may provide the ability to create log data when console commands are not available and avoid repetitive entries of console commands.

In one embodiment, the configuration file of CPCommOS may set the log level as "HIGH" for all XNIOP component using the following exemplary instruction: XTRACE, HIGH. In another embodiment, the configuration file of CPCommOS may set the log level for specific components of XNIOP, for example, setting TCP as "HIGH" and "SSL" as "LOW," using the following exemplary instructions: XTRACE, TCP, HIGH XTRACE, SSL, LOW.

In some embodiments, the computer program 110 may make a request to the non-emulated networking interface (XNIOP) 125 to retrieve stored log data. For example, in one embodiment, CPCommOS may make a request to the non-emulated networking interface (XNIOP) 125 to retrieve stored log data. Upon receiving the request, the operating system 120 may send the stored log data back to CPCommOS.

The retrieved information of stored log data may include the same information as the log data that was created. In some embodiments, the retrieved log data may include number of fields, type of logged activity, sub-type of logged activity, data input size, upload request, upload byte count, log showing request, number of log showing fields, etc. In one embodiment, the stored log data can be retrieved using the following instructions: CPCOMM CADBUG COMMAND LOG UPLOAD. In one embodiment, when the computer program 110 receives the stored log data, the computer program 100 may store the log data in a log file, e.g., a CPCommOS log file.

Figure 2:
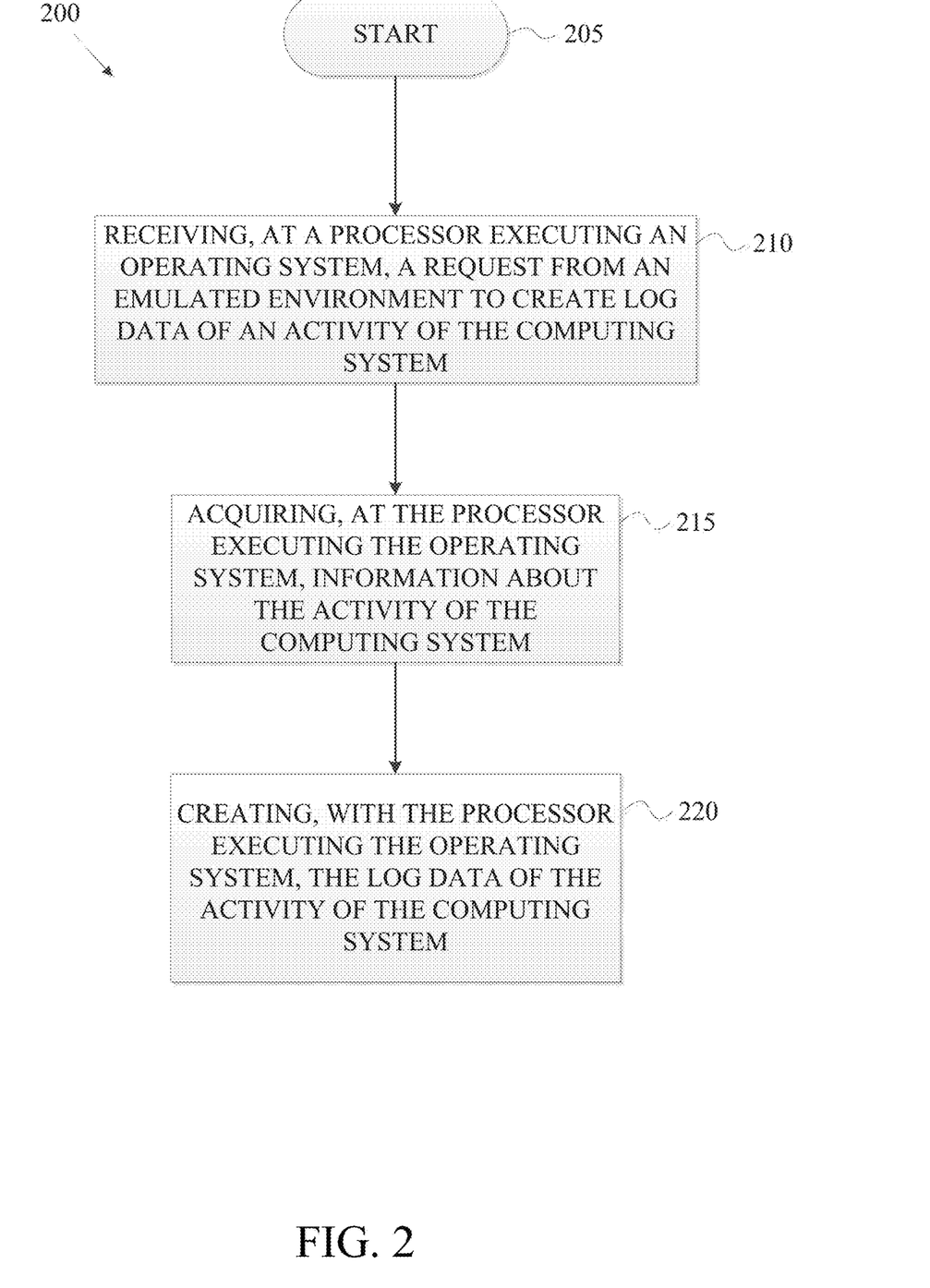
FIG. 2 is a flow chart illustrating a method for logging data in a computing system according to one embodiment of the disclosure.

FIG. 2 is a flow chart illustrating a method 200 for logging data in a computing system according to one embodiment of the disclosure. The method 200 shown in FIG. 2 may be part of or combined with other methods disclosed herein, such as the methods shown in FIGS. 3-5. The method 200 shown in FIG. 2 may be implemented in the systems and apparatuses disclosed herein, such as the systems and apparatuses shown in FIGS. 1 and 6-8.

As shown in FIG. 2, the method 200 starts at block 205. The method 200 proceeds to block 210. At block 210, method 200 includes receiving, at a processor executing an operating system, a request from an emulated environment to create log data of an activity of the computing system. The method 200 proceeds to block 215 which includes acquiring, at the processor executing the operating system, information about the activity of the computing system. The method proceeds to block 220 which includes creating, with the processor executing the operating system, the log data of the activity of the computing system.

In one embodiment of the method 200, the operating system of blocks 210, 215, and 220 may be the operating system 120 shown in FIG. 1. In another embodiment, the operating system of blocks 210, 215, and 220 may be System Architecture Interface Layer (SAIL), Unix, Linux, or the like. In another embodiment, the operating system of blocks 210, 215, and 220 may include a non-emulated networking interface, such as the non-emulated networking interface 125 shown in FIG. 1. In another embodiment, the operating system of blocks 210, 215, and 220 may include XNIOP.

In one embodiment of the method 200, the emulated environment of block 210 may be the emulated environment 105 shown in FIG. 1. In another embodiment, the emulated environment of block 210 may be Linux, Windows, Java, Unix, OS 2200, or the like. In another embodiment, the emulated environment of block 210 may include the computer program 110 shown in FIG. 1. In another embodiment, the emulated environment of block 210 may include CPCommOS or the like communication platforms.

In one embodiment of the method 200, the log data of blocks 210 and 220 may include any information existing in any data structure. In another embodiment of the method 200, the log data of blocks 210 and 220 may include information, such as, for example, number of fields, type of logged activity, sub-type of logged activity, data input size, upload request, upload byte count, log showing request, number of log showing fields, etc.

In one embodiment of method 200, the activity of the computing system of blocks 210, 215, and 220 may be networking activities done through a transmission control protocol/internet protocol (TCP/IP), transport layer security (TLS), secure sockets layer (SSL), user datagram protocol (UDP), routing, or the like. In one embodiment of method 200, the activity of the computing system of blocks 210, 215, and 220 may be non-networking activities.

Figure 3:
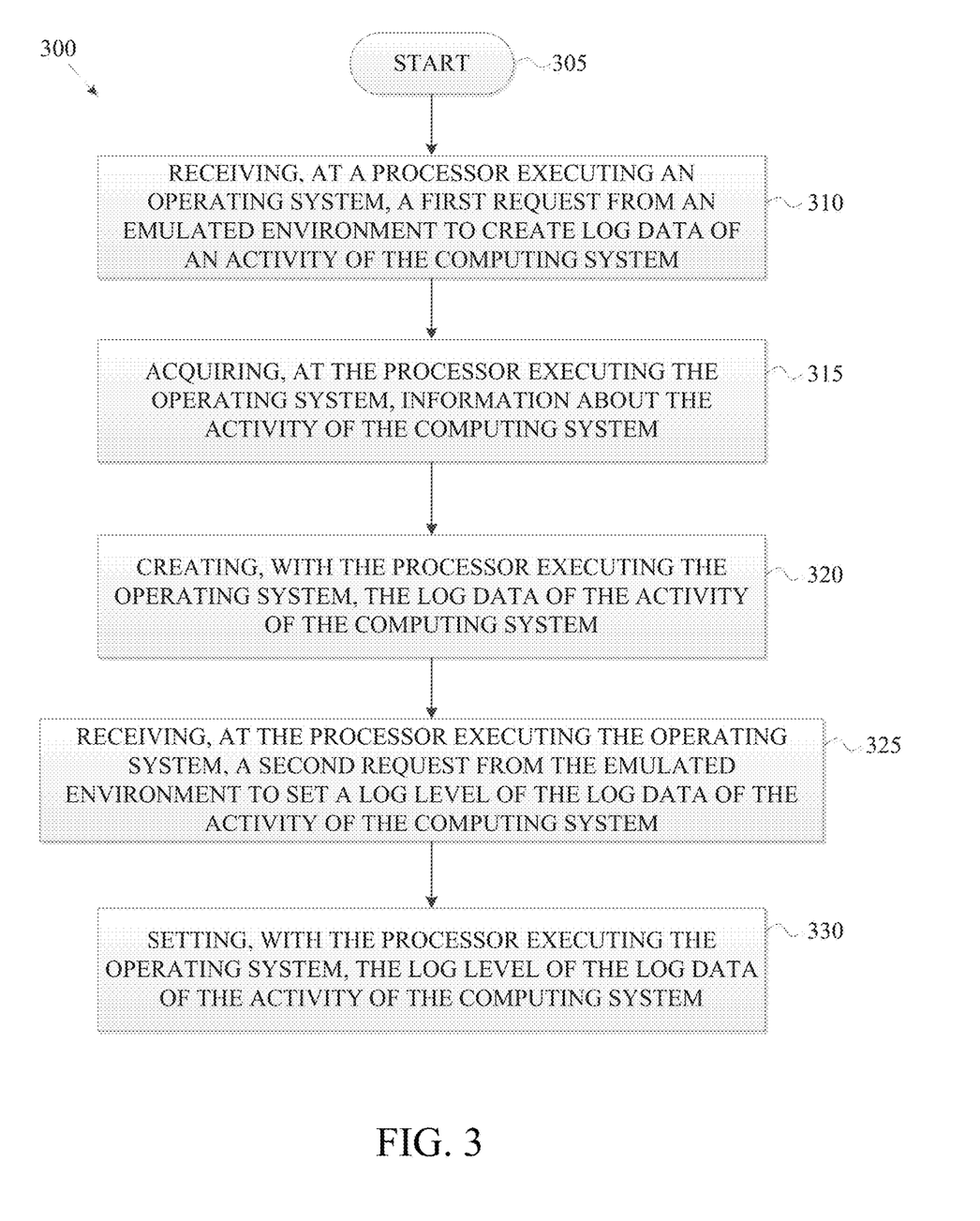
FIG. 3 is a flow chart illustrating a method for logging data and setting log levels in a computing system according to one embodiment of the disclosure.

FIG. 3 is a flow chart illustrating a method 300 for logging data and setting log levels in a computing system according to one embodiment of the disclosure. The method 300 shown in FIG. 3 may be part of or combined with other methods disclosed herein, such as, for example, the methods shown in FIGS. 2 and 4-5. The method 300 shown in FIG. 3 may be implemented in the systems and apparatuses disclosed herein, such as the systems and apparatuses shown in FIGS. 1 and 6-8.

As shown in FIG. 3, the method 300 starts at block 305. The method 300 proceeds to block 310 which includes receiving, at a processor executing an operating system, a first request from an emulated environment to create log data of an activity of a computing system. The method 300 proceeds to block 315 which includes acquiring, at the processor executing the operating system, information about the activity of the computing system. The method 300 proceeds to block 320 which includes creating, with the processor executing the operating system, the log data of the activity of the computing system. The method 300 proceeds to block 325 which includes receiving, at the processor executing the operating system, a second request from the emulated environment to set a log level of the log data of the activity of the computing system. The method 300 proceeds to block 330 which includes setting, with the processor executing the operating system, the log level of the log data of the activity of the computing system.

In one embodiment of the method 300, the operating system of blocks 310, 315, 320, 325, and 330 may be a computing system configured with the operating system 120 shown in FIG. 1. In another embodiment, the operating system of blocks 310, 315, 320, 325, and 330 may be a computing system configured with System Architecture Interface Layer (SAIL), Unix, Linux, or the like. In another embodiment, the operating system of blocks 310, 315, 320, 325, and 330 may include a non-emulated networking interface, such as the non-emulated networking interface 125 shown in FIG. 1. In another embodiment, the operating system of blocks 310, 315, 320, 325, and 330 may include XNIOP.

In one embodiment of the method 300, the emulated environment of blocks 310 and 325 may be the emulated environment 105 shown in FIG. 1. In another embodiment, the emulated environment of blocks 310 and 325 may be Linux, Windows, Java, Unix, OS 2200, or the like. In another embodiment, the emulated environment of blocks 310 and 325 may include the computer program 110 shown in FIG. 1. In another embodiment, the emulated environment of blocks 310 and 325 may include CPCommOS or the like communication platforms.

In one embodiment of the method 300, the log data of blocks 310, 320, 325, and 330 may include any information existing in any data structure. In another embodiment of the method 300, the log data of blocks 310, 320, 325, and 330 may include information, such as number of fields, type of logged activity, sub-type of logged activity, data input size, upload request, upload byte count, log showing request, number of log showing fields, etc.

In one embodiment of method 300, the activity of the computing system of blocks 310, 315, 320, 325, and 330 may be networking activities done through a transmission control protocol/internet protocol (TCP/IP), transport layer security (TLS), secure sockets layer (SSL), user datagram protocol (UDP), routing, or the like. In one embodiment of method 300, the activity of the computing system of blocks 310, 315, 320, 325, and 330 may be non-networking activities.

In one embodiment of method 300, the log level of blocks 325 and 330 may be defined in different degrees without limitation, for example, LOW, MEDIUM, HIGH, etc. In another embodiment of method 300, the log levels of blocks 325 and 330 may be set for log data that is already stored in computer-readable mediums. In another embodiment of method 300, the log levels of blocks 325 and 330 may be set for log data that will be created for future activities.

Figure 4:
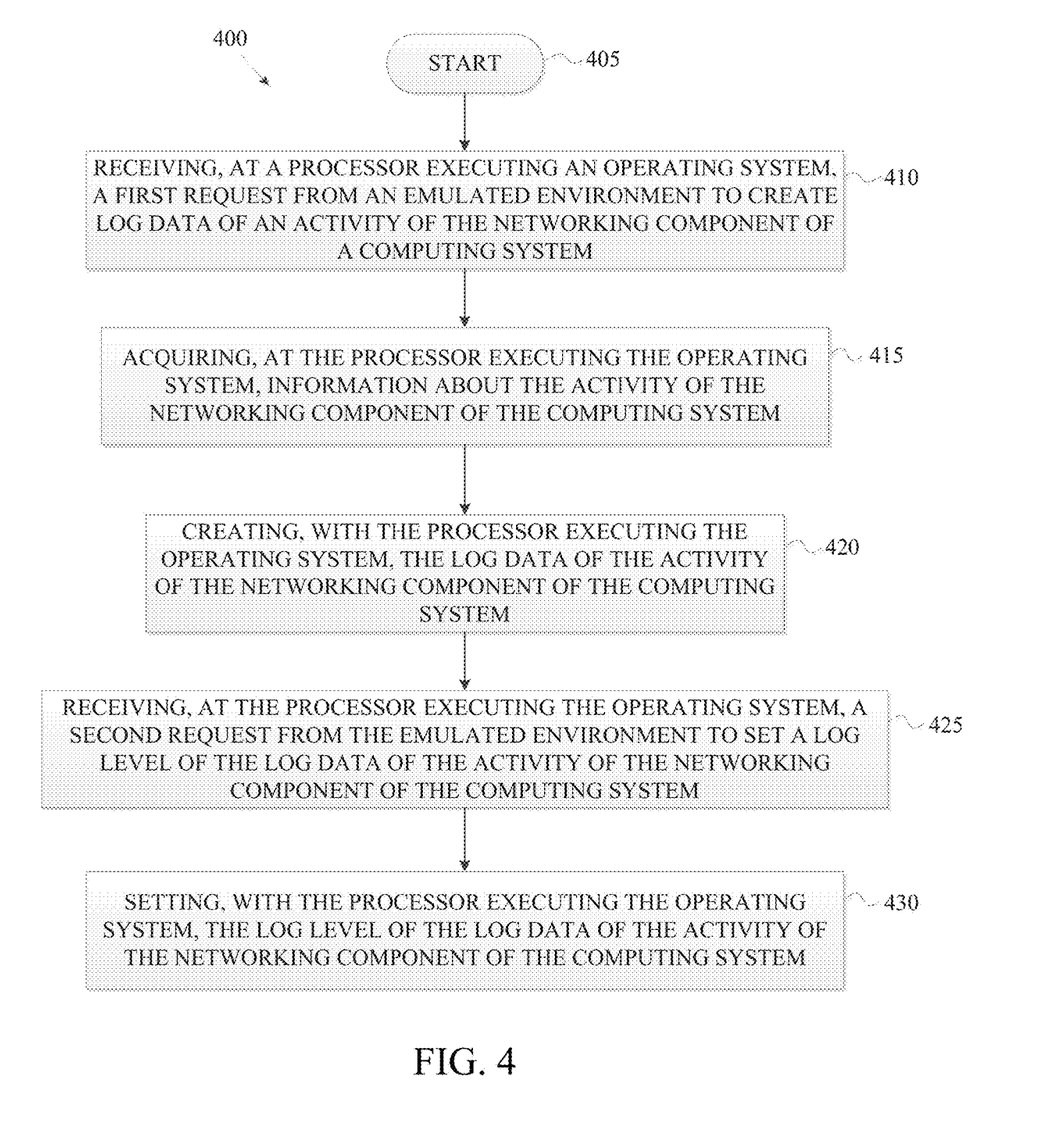
FIG. 4 is a flow chart illustrating a method for logging data and setting log levels in a computer system according to one embodiment of the disclosure.

FIG. 4 is a flow chart illustrating a method 400 for logging data and setting log levels in a computer system according to one embodiment of the disclosure. The method 400 shown in FIG. 4 may be part of or combined with other methods disclosed herein, such as the methods shown in FIGS. 2-3 and 5. The method 400 shown in FIG. 4 may be implemented in the systems and apparatuses disclosed herein, such as the systems and apparatuses shown in FIGS. 1 and 6-8.

As shown in FIG. 4, the method 400 starts at block 405. The method 400 proceeds to block 410 which includes receiving, at a processor executing an operating system, a first request from an emulated environment to create log data of an activity of a networking component of the computing system. The method 400 proceeds to block 415 which includes acquiring, at the processor executing the operating system, information about the activity of the networking component of the computing system. The method 400 proceeds to block 420 which includes creating, with the processor executing the operating system, the log data of the activity of the networking component of the computing system. The method 400 proceeds to block 425 which includes receiving, at the processor executing the operating system, a second request from the emulated environment to set a log level of the log data of the activity of the networking component of the computing system. The method 400 proceeds to block 430 which includes setting, with the processor executing the operating system, the log level of the log data of the activity of the networking component of the computing system.

In one embodiment of the method 400, the blocks 410, 415, 420, 425, and 430 may be a computing system configured with operating system 120 shown in FIG. 1. In another embodiment, the operating system of blocks 410, 415, 420, 425, and 430 may be a computing system configured with System Architecture Interface Layer (SAIL), Unix, Linux, or the like. In another embodiment, the operating system of blocks 410, 415, 420, 425, and 430 may include a non-emulated networking interface, such as the non-emulated networking interface 125 shown in FIG. 1. In another embodiment, the operating system of blocks 410, 415, 420, 425, and 430 may include XNIOP.

In one embodiment of the method 400, the emulated environment of blocks 410 and 425 may be the emulated environment 105 shown in FIG. 1. In another embodiment, the emulated environment of blocks 410 and 425 may be Linux, Windows, Java, Unix, OS 2200, or the like. In another embodiment, the emulated environment of blocks 410 and 425 may include the computer program 110 shown in FIG. 1. In another embodiment, the emulated environment of blocks 410 and 425 may include CPCommOS or the like communication platforms.

In one embodiment of the method 400, the log data of blocks 410, 420, 425, and 430 may include any information existing in any data structure. In another embodiment of the method 400, the log data of blocks 410, 420, 425, and 430 may include information, such as number of fields, type of logged activity, sub-type of logged activity, data input size, upload request, upload byte count, log showing request, number of log showing fields, etc.

In one embodiment of method 400, the networking component of the computing system of blocks 410, 415, 420, 425, and 430 may employ transmission control protocol/internet protocol (TCP/IP), transport layer security (TLS), secure sockets layer (SSL) protocols, user datagram protocol (UDP), routing, or the like.

In one embodiment of method 400, the log levels of blocks 425 and 430 may be defined in different degrees without limitation, for example, LOW, MEDIUM, HIGH, etc. In another embodiment of method 400, the log levels of blocks 425 and 430 may be set for log data that are already stored in computer-readable mediums. In another embodiment of method 400, the log levels of blocks 425 and 430 may be set for log data that will be created for future activities.

Figure 5:
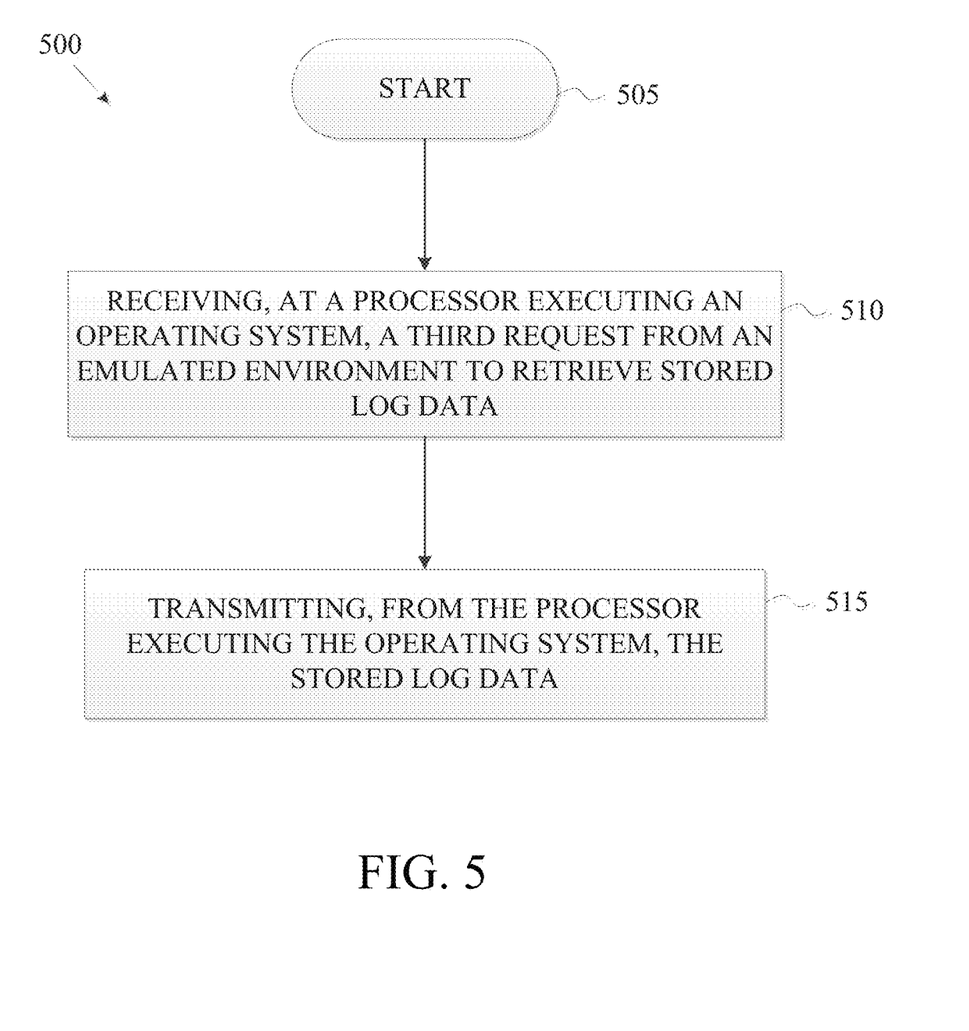
FIG. 5 is a flow chart illustrating a method for retrieving stored log data according to one embodiment of the disclosure.

FIG. 5 is a flow chart illustrating a method 500 for retrieving stored log data according to one embodiment of the disclosure. The method 500 shown in FIG. 5 may be part of or combined with other methods disclosed herein, such as the methods shown in FIGS. 2-4. The method 500 shown in FIG. 5 may be implemented in the systems and apparatuses disclosed herein, such as the systems and apparatuses shown in FIGS. 1 and 6-8.

As shown in FIG. 5, the method 500 starts at block 505. The method 500 proceeds to block 510 which includes receiving, at a processor executing an operating system, a third request from an emulated environment to retrieve stored log data. The method 500 proceeds to block 515 which includes transmitting, from the processor executing the operating system the stored log data.

In one embodiment of the method 500, the operating system of blocks 510 and 515 may be the operating system 120 shown in FIG. 1. In another embodiment, the operating system of blocks 510 and 515 may be System Architecture Interface Layer (SAIL), Unix, Linux, or the like. In another embodiment, the operating system of blocks 510 and 515 may include a non-emulated networking interface, such as the non-emulated networking interface 125 shown in FIG. 1. In another embodiment, the operating system of blocks 510 and 515 may include XNIOP.

In one embodiment of the method 500, the emulated environment of block 510 may be the emulated environment 105 shown in FIG. 1. In another embodiment, the emulated environment of block 510 may be Linux, Windows, Java, Unix, OS 2200, or the like. In another embodiment, the emulated environment of block 510 may include the computer program 110 shown in FIG. 1. In another embodiment, the emulated environment of block 510 may include CPCommOS or the like communication platforms.

In one embodiment of the method 500, the stored log data of blocks 510 and 515 may include any information existing in any data structure. In another embodiment of the method 500, the stored log data of blocks 510 and 515 may include information, such as number of fields, type of logged activity, sub-type of logged activity, data input size, upload request, upload byte count, log showing request, number of log showing fields, etc. In another embodiment of the method 500, the stored log data of blocks 510 and 515 may be stored in computer-readable mediums.

Figure 6:
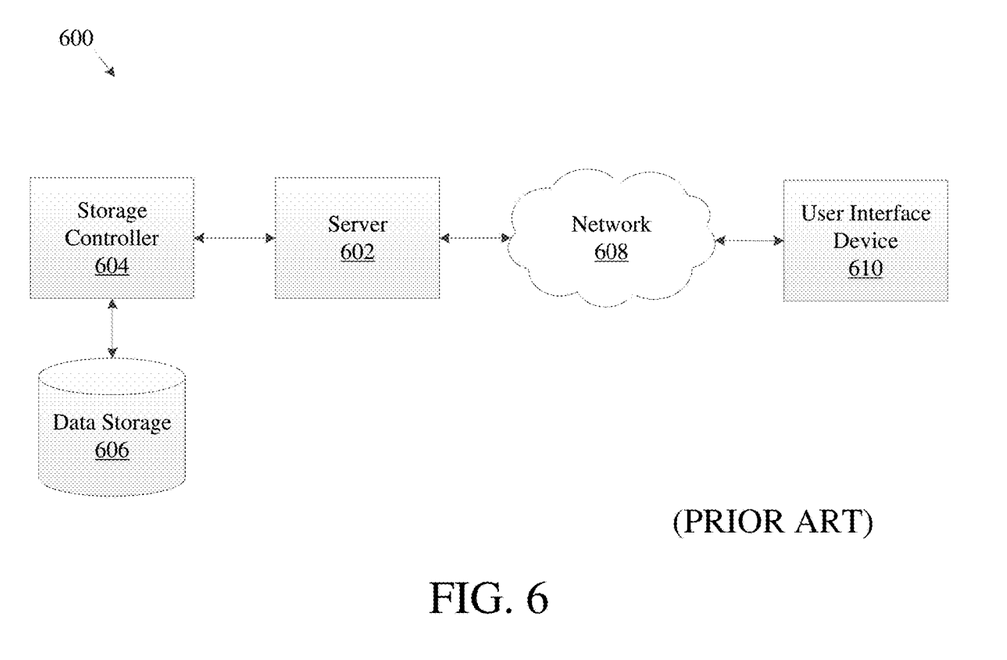
FIG. 6 is a block diagram illustrating a computer network according to one embodiment of the disclosure.

FIG. 6 illustrates a computer network 600 for obtaining access to database files in a computing system according to one embodiment of the disclosure. The system 600 may include a server 602, a data storage device 606, a network 608, and a user interface device 610. The server 602 may also be a hypervisor-based system executing one or more guest partitions hosting operating systems with modules having server configuration information. In a further embodiment, the system 600 may include a storage controller 604, or a storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other mobile communication device having access to the network 608. In a further embodiment, the user interface device 610 may access the Internet or other wide area or local area network to access a web application or web service hosted by the server 602 and may provide a user interface for enabling a user to enter or receive information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 7:
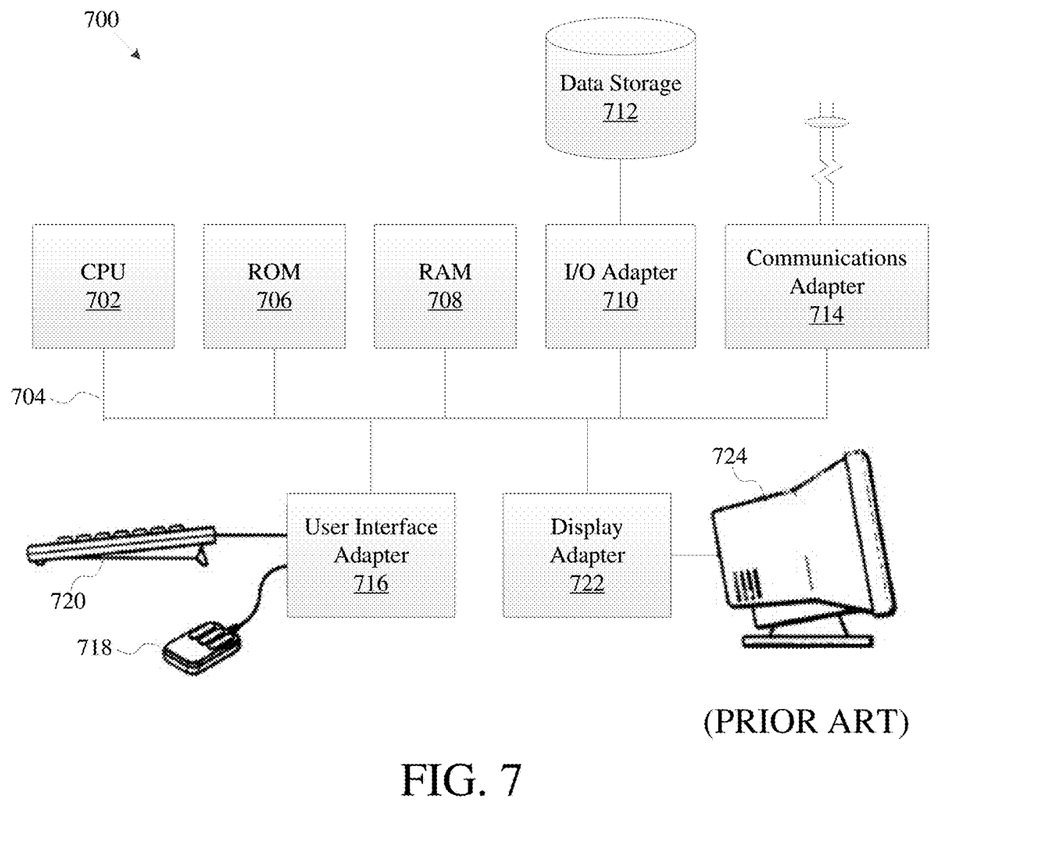
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an I/O adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 700 may be virtualized for access by multiple users and/or applications.

Figure 8A:
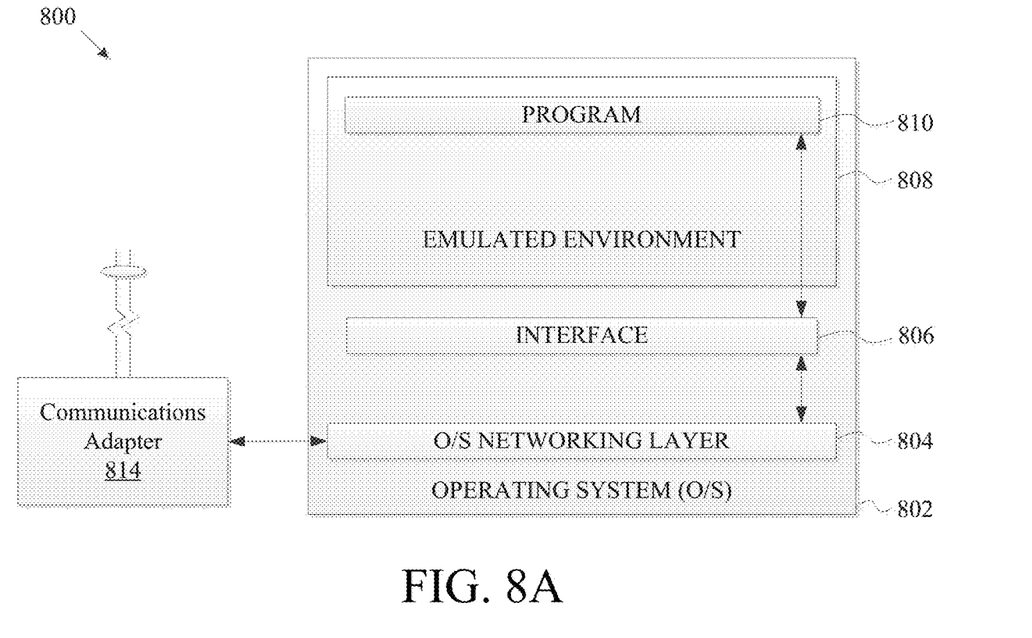
FIG. 8A is a block diagram illustrating a server hosting an emulated software environment for virtualization according to one embodiment of the disclosure.

FIG. 8A is a block diagram illustrating a server hosting an emulated software environment for virtualization according to one embodiment of the disclosure. An operating system 802 executing on a server includes drivers for accessing hardware components, such as a networking layer 804 for accessing the communications adapter 814. The operating system 802 may be, for example, Linux or Windows. An emulated environment 808 in the operating system 802 executes a program 810, such as Communications Platform for Open Systems (CPCommOS). The program 810 accesses the networking layer 804 of the operating system 802 through a non-emulated interface 806, such as extended network input output processor (XNIOP). The non-emulated interface 806 translates requests from the program 810 executing in the emulated environment 808 for the networking layer 804 of the operating system 802.

Figure 8B:
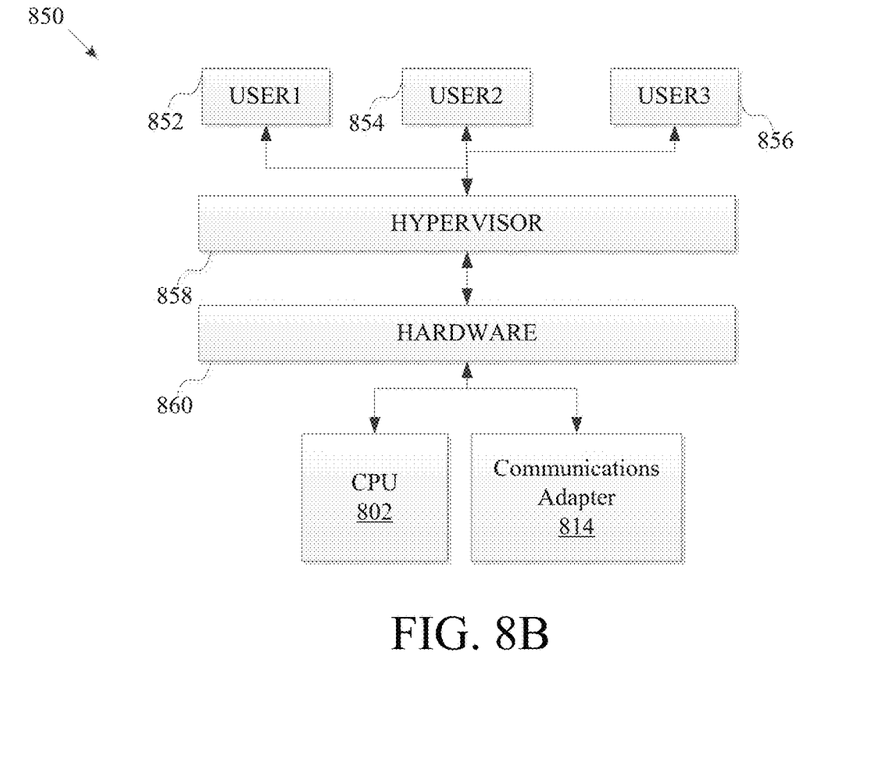
FIG. 8B is a block diagram illustrating a server hosting an emulated hardware environment according to one embodiment of the disclosure.

In another example, hardware in a computer system may be virtualized through a hypervisor. FIG. 8B is a block diagram illustrating a server hosting an emulated hardware environment according to one embodiment of the disclosure. Users 852, 854, 856 may access the hardware 860 through a hypervisor 858. The hypervisor 858 may be integrated with the hardware 860 to provide virtualization of the hardware 860 without an operating system, such as in the configuration illustrated in FIG. 8A. The hypervisor 858 may provide access to the hardware 860, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for logging data in a computing system, comprising:
    receiving, at a processor executing an operating system in a non-emulated environment, a first request from an emulated environment to create log data of an activity in the non-emulated environment of the computing system;
    acquiring, at the processor, information about the activity;
    creating, with the processor, the log data of the activity;
    receiving, at the processor, a second request from the emulated environment to set the log level of the log data of the activity in the non-emulated environment of the computing system;
    setting, with the processor, the log level of the log data of the activity in response to the second request, wherein setting the log level includes setting the log level as low, medium or high; and
    sharing the log data of the non-emulated environment with the emulated environment.

2. The method of claim 1, wherein the first request and the second request are received at the processor simultaneously.

3. The method of claim 1, wherein the activity is an activity of a networking component of the computing system.

4. The method of claim 1, further comprising:
    receiving, at the processor, a third request from the emulated environment to retrieve stored log data; and
    transmitting, from the operating system, the stored log data.

5. The method of claim 4, wherein the first request, the second request, and the third request are received at the processor simultaneously.

6. A computer program product, comprising:
    a non-transitory computer-readable medium comprising instructions which, when executed by a processor of a computing system, cause the processor to perform the steps of:
    receiving a first request from an emulated environment to create log data of an activity in a non-emulated environment of the computing system; acquiring information about the activity;
    creating the log data of the activity; receiving, at the processor, a second request from the emulated environment to set the log level of the log data of the activity in the non-emulated environment of the computing system;
    setting, with the processor, the log level of the log data of the activity in response to the second request, wherein setting the log level includes setting the log level as low, medium or high; and
    sharing the log data of the non-emulated environment with the emulated environment.

7. The computer program product of claim 6, wherein the first request and the second request are received simultaneously.

8. The computer program product of claim 6, wherein the activity is an activity of a networking component of the computing system.

9. The computer program product of claim 7, wherein the medium further comprises instructions to cause the processor to perform the steps of:
    receiving a third request from the emulated environment to retrieve stored log data; and
    transmitting the stored log data.

10. The computer program product of claim 9, wherein the first request, the second request, and the third request are received simultaneously.

11. An apparatus, comprising:
a memory; and a processor coupled to the memory, the processor being configured to execute the steps of:
receiving a first request from an emulated environment to create log data of an activity in a non-emulated environment of the computing system;
acquiring information about the activity;
creating the log data of the activity;
receiving, at the processor, a second request from the emulated environment to set the log level of the log data of the activity in the non-emulated environment of the computing system;
setting, with the processor, the log level of the log data of the activity in response to the second request, wherein setting the log level includes setting the log level as low, medium or high; and
sharing the log data with the emulated environment.

12. The apparatus of claim 11, wherein the first request and the second request are received simultaneously.

13. The apparatus of claim 11, wherein the activity is an activity of a networking component of the computing system.

14. The apparatus of claim 11, wherein the processor is further configured to perform the steps of:
receiving a third request from the emulated environment to retrieve stored log data; and
transmitting the stored log data.

15. The method of claim 1, wherein the first request does not specify a component and/or an activity.

16. The computer program product of claim 6, wherein the first request does not specify a component and/or activity.

17. The apparatus of claim 11, wherein the first request does not specify a component and/or activity.

* * * * *